United States Patent [19]

Kaump

[11] 4,349,436
[45] Sep. 14, 1982

[54] GRATE AND WATER RECOVERY SYSTEM

[76] Inventor: Roland F. Kaump, 1714 W. 23rd St., Loveland, Colo. 80537

[21] Appl. No.: 206,111

[22] Filed: Nov. 12, 1980

[51] Int. Cl.³ .......................................... B01D 39/20
[52] U.S. Cl. .................................. 210/104; 210/209; 210/418; 210/498
[58] Field of Search .............................. 210/103–105, 210/110, 163, 166, 420, 421, 474, 498, 123, 125, 127, 207, 209, 418

[56] References Cited

U.S. PATENT DOCUMENTS

| | | | |
|---|---|---|---|
| 1,631,585 | 6/1927 | D'Olier et al. | 210/498 |
| 1,940,952 | 12/1933 | Hutchens | 210/498 |
| 2,150,889 | 3/1939 | Colville | 210/498 |
| 3,915,857 | 10/1975 | Olson | 210/104 X |
| 4,162,218 | 7/1979 | McCormick | 210/104 |
| 4,206,522 | 6/1980 | Baker | 210/105 X |
| 4,224,155 | 9/1980 | Milne | 210/474 X |

*Primary Examiner*—Thomas G. Wyse
*Attorney, Agent, or Firm*—Howard I. Podell

[57] ABSTRACT

A water recovery system in which drain water from appliances, sinks and bathtubs are conserved in a storage recovery tank for treatment and reuse as a water supply for toilets. The drain water is directed through an outlet to flow over a pivoted grate that is mounted above the top opening of the storage tank, with the grate formed of spaced inverted T-shaped ribs and normally held at an acute angle, such as ten degrees, to the horizontal plane by a spring so that debris retained on the grate is washed diagonally downwards off the top surface of the grate to fall off the lower end of the grate into a debris-collection and tank overflow unit. The drain water, itself, falls between the grate ribs into the storage recovery tank. The grate is linked to an outlet valve leading from a liquid chemical storage tank so that liquid treatment chemicals in the chemical tank are released into the storage tank during periods of drain water flow onto the grate, when the grate is pivoted to a greater angle, such as twenty degrees, to the horizontal by the weight of drain water flowing on and through the grate. The grate is also linked to a first float which prevents the grate from opening the release valve of the chemical tank when the storage tank is full. A second float in the storage recovery tank admits fresh water into the tank, when the tank level falls below a pre-set minimum. A pump operated by a pressure switch automatically supplies water to the toilet supply line upon demand.

12 Claims, 5 Drawing Figures

GRATE AND WATER RECOVERY SYSTEM

BACKGROUND OF THE INVENTION

The following U.S. patents describe screens and other apparatus employed in the recycling of drain water: Nos. 4,162,218; 3,440,669; 3,318,449; 4,115,879; 3,112,497; 3,843,976; 3,945,327; 3,884,940; 3,594,825; 4,070,714; 4,009,104; 3,922,730; 4,083,067; and 4,017,395.

These prior patents do not describe nor suggest the effectiveness of the improved structure devised by the applicant for the conservation of water and the conservation of energy required to supply water for waste activities such as toilet use by the recycling of domestic drain water.

SUMMARY OF THE INVENTION

My invention is a water recovery system in which drain water from appliances, sinks and bathtubs are conserved in a storage recovery tank for treatment and reuse as a water supply for toilets. The drain water is directed through an outlet to flow over a pivoted grate that is mounted above the top opening of the storage tank, with the grate formed of spaced inverted T-shaped ribs and normally held at an acute angle, such as ten degrees, to the horizontal plane by a spring so that debris retained on the grate is washed diagonally downwards off the top surface of the grate to fall off the lower end of the grate into a debris-collection and tank overflow unit. The drain water, itself, falls between the grate ribs into the storage recovery tank. The grate is linked to an outlet valve leading from a liquid chemical storage tank so that liquid treatment chemicals in the chemical tank are released into the storage tank during periods of drain water flow onto the grate, when the grate is pivoted to a greater angle, such as twenty degrees, to the horizontal by the weight of drain water flowing on and through the grate. The grate is also linked to a first float which prevents the grate from opening the release valve of the chemical tank when the storage tank is full. A second float in the storage recovery tank admits fresh water into the tank, when the tank level falls below a pre-set minimum. A pump operated by a pressure switch automatically supplied water to the toilet supply line up demand.

My invention may also be employed as a non-clogging grate for a roof gutter drain so that leaves and other debris in a roof gutter would be washed sidewards off my grate to an overflow outlet to prevent the clogging of the gutter drain pipe.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
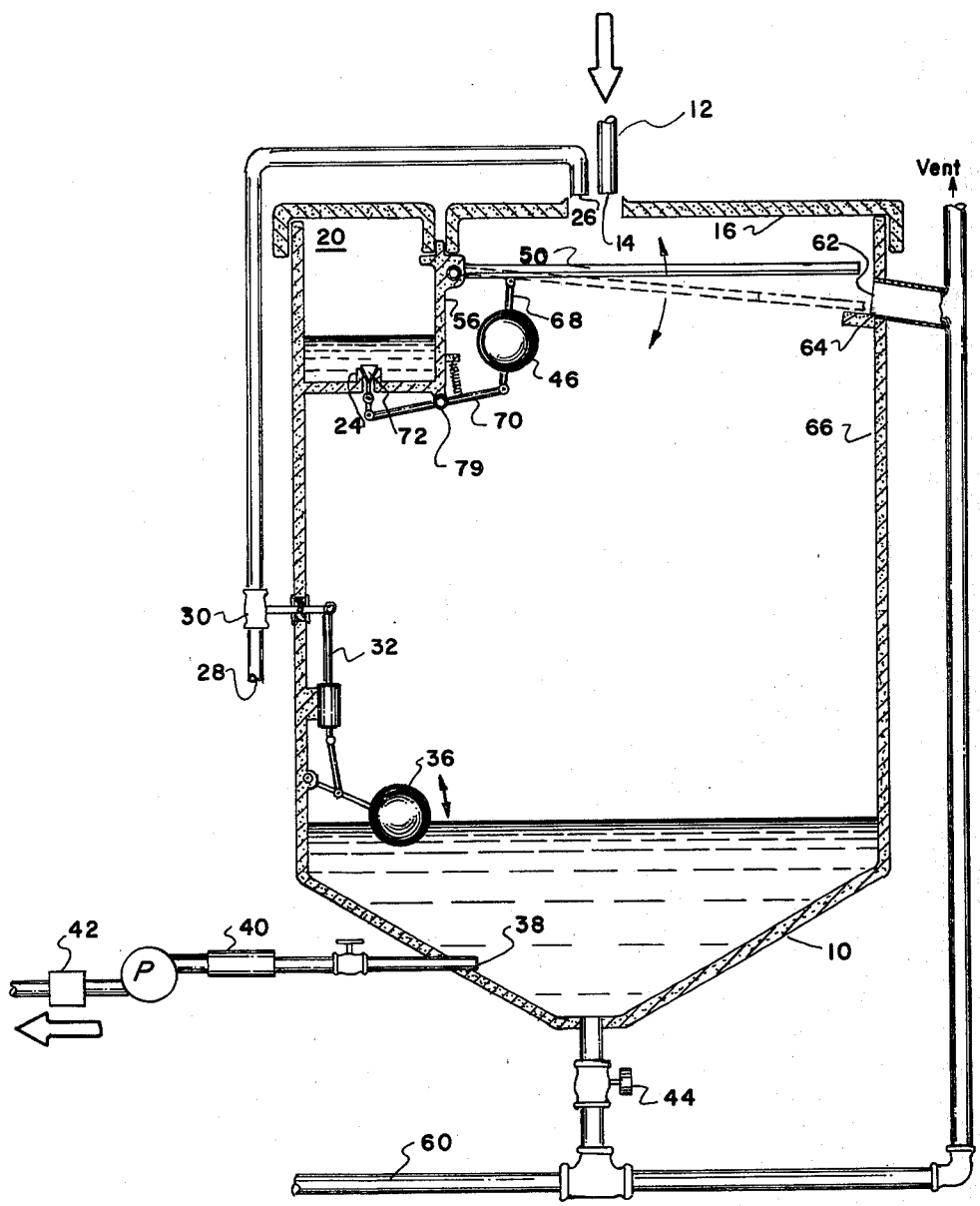
FIG. 1 is a sectional view of the storage recovery tank fitted with the grate of the invention.

Turning now descriptively to the drawings, in which similar reference characters denote similar elements throughout the several views, FIG. 1 illustrates the storage recovery tank 10 of the invention, which is preferably located so as to receive under gravity flow, drain water from sinks and appliances through inlet line 12 which is joined to an outlet 14 in top lid 16 of the tank 10. This drain water then flows through the spaced ribs 52 of pivotable grate 50 and into the tank.

Liquid treatment chemicals are stored in a chemical tank 20 in the upper part of the housing of tank 10 with such treatment chemicals being released to flow under gravity into tank 10 through treatment valve 24.

Make-up fresh water is added through inlet 26 from a water supply pipe 28 as controlled by a valve 30 actuated by linkage 32 joined to pivoted float 36.

It will be understood by those skilled in the art that inlet 26 for make-up water should be located above the top of the tank to permit water to freely fall from inlet 26 through a hole in lid 16 into the tank and to prevent any possibility of backflow of water from tank 10 into the water supply line 28, in accordance with the regulations of many areas.

Treated water from tank 10 flows through outlet 38 and filter 40 into the inlet of a pump which is actuated by pressure switch 42 to supply this treated water under pressure to the flush tank of a toilet (not shown) when the inlet valve of the flush tank is open.

A manual drain valve 44 located at the bottom of tank 10 connects to the main sewer drain line 60 of the installation.

Grate 50 is pivoted about support 54 fixed to the tank wall 56 and biased by a tension spring 58 to extend normally at an acute angle, such as ten degrees, to the horizontal. However, the weight of water from lid outlet 14, falling on the grate flange members 57 causes the grate to pivot downwards to a larger horizontal angle, such as twenty degrees, so that the trailing edge 59 of the grate rests on an inclined lip 64 of the tank wall 66. Grate 50 is linked to rod 68 which is pivotally connected to valve rod 70. Rod 70 is joined to valve body 72 to extend upwards into valve seat 74 of treatment valve 24 that is mounted in bottom wall 78 of chemical tank 20. Rod 70 is pivotally mounted to support 79.

Bias tension spring 58 joins rod 68 to the upper section of tank wall 56.

A float is fixed to rod 68 so as to cause rod 68, and grate 50 to rise when the level of the tank is at a maximum, so as to close valve 24, and conserve the use of treatment chemicals, since additional water falling on grate 50 runs off through overflow drain outlet 62 to drain line 60.

Figure 2:
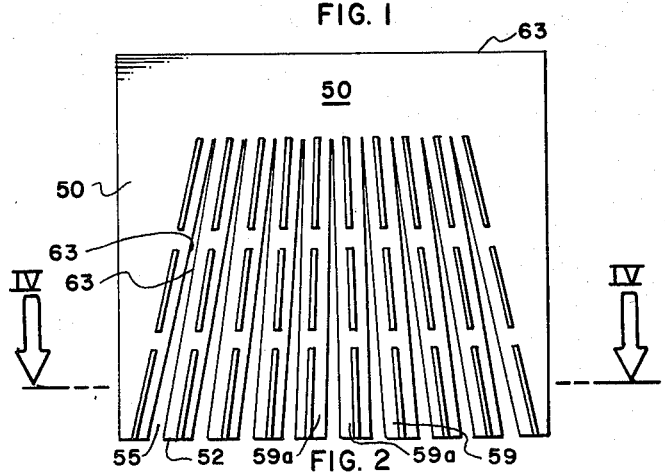
FIG. 2 is a plan view of the grate.
Figure 3:
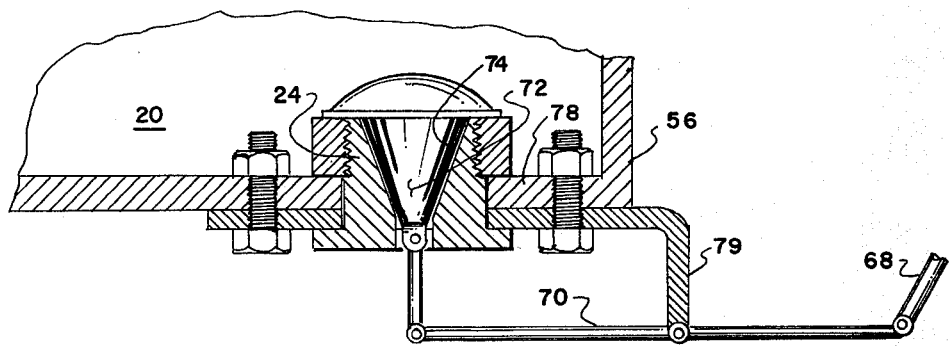
FIG. 3 is a sectional view of the tank valve.
Figure 4:
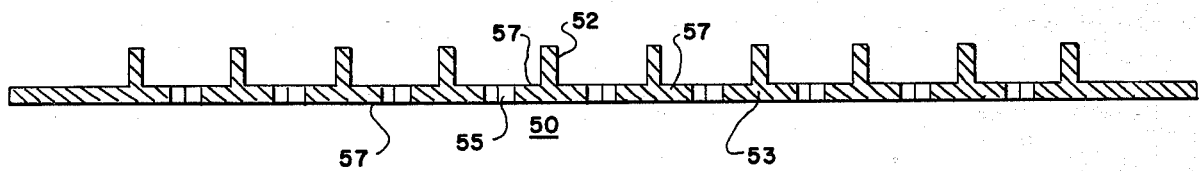
FIG. 4 is a sectional view of the grate, taken along line 4—4 of FIG. 2.

As shown in FIGS. 2 and 4, the grate 50 is formed of a plurality of upraised spaced T-sections 53 spaced apart by slotted openings 55. The T-sections 53 are each formed with an upraised longitudinal rib 52 extending between two flange members 57 lying in the plane of the grate. Openings 55 and T-section 53 extend from the trailing edge 59 of the grate but terminate short of the leading edge 63 of the grate. Preferably openings 55 increase in width and the axis of the T-members diverse from each other in the direction towards the trailing edge of the grate.

Consequently, water and debris falling on the upper portion of the grate, near the leading edge, will flow along flange members 57 downwards towards the trailing edge. Water flowing on the flange members will thus continuously flush debris that does not fall through opening 55 downwards along the length of the grate so that such debris will fall off of the trailing edge of the grate and into overflow drain outlet 62. The water and debris are both channeled by the upraised rib sections 52 so as to enable water on the flange member to splash and float the debris towards the trailing edge as debris build-up mounts between any pair of adjacent rib sections 52.

The grate acts therefore as a self-cleansing filter screen in action. The diverging walls 63 of openings 55 distributes the flow of water and debris along the length of the grate.

The weight of the water falling on the grate serves to increase the weight of the grate and to cause the trailing edge of the grate to rotate downwards to open the treatment valve 25 when water is entering the recovery tank to cause treatment chemicals to flow into the recovery tank during periods of the recovery tank from lid drain outlet 14.

The optimum width of the grate openings at each longitudinal distance towards the trailing edge is chosen so that as the flow of water on the flange members approach the trailing edge, the increase in width of the opening ensures that more of such water will fall through the opening and that a minimum of the water flowing on the grate will fall off the trailing edge and into the overflow drain, except as required to flush debris into the overflow drain. Thus with no debris on the grate, all of the water will fall through the openings before reaching the trailing edge. However, debris that blocks such flow of water will cause the momentary level of water on the flange sections to rise since the openings are narrower towards the leading edge of the grate and of insufficient width to permit immediate flow of all such backed-up water through such narrow opening sections. Such momemtary rising of water level on the flanges serves to add to the thrust against such debris and to float lighter debris to cause eventual dislodgment of such debris into the overflow drain.

It is to be noted that the miminum water level is maintained in the tank by float 36 at a considerably higher level than the outlet 38 so that floating debris in the tank does not exit through outlet 38. Similarly, the location of outlet 38 above the drain valve outlet and bottom of the tank permits dense debris to settle in the tank below outlet 38.

A grate formed of spaced inverted T-sections separated by individual openings may be employed as a self-cleansing filter for other purposes than this storage recovery tank.

Figure 5:
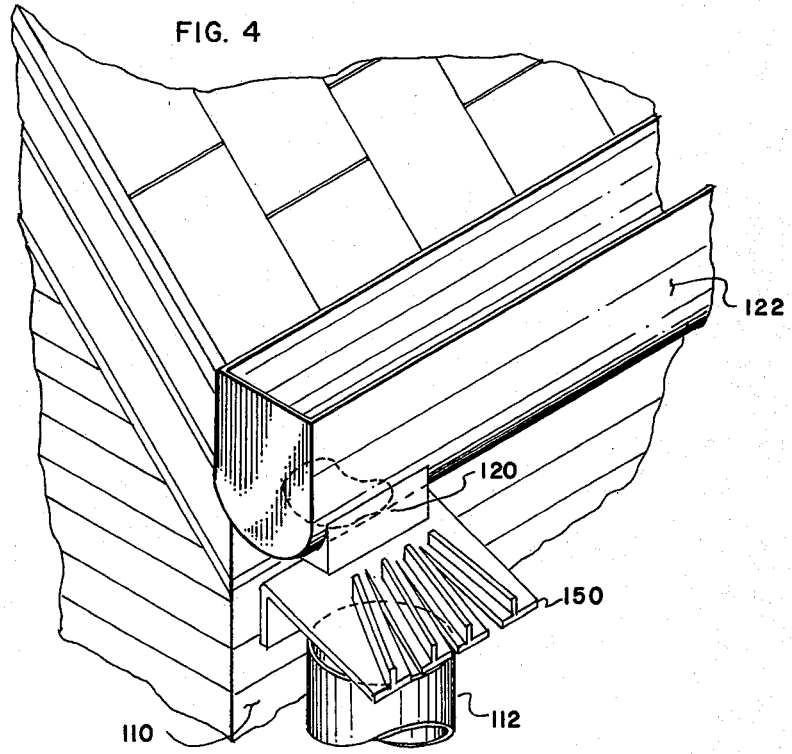
FIG. 5 is a perspective view of an alternative use of the grate.

FIG. 5 illustrates an alternative use for a grate 150 of similar shape to grate 50 of the invention. Grate 150 is fixed in a diagonal plane extending downwards towards the grate trailing edge to an exterior side of a building wall 110 below the outlet 120 of a roof gutter 122. Water flowing out of outlet 120 flows after filtering through the openings of grate 150 into vertical leader pipe 112. Debris however remains on the upper face of the grate and is flushed by flow of water between the inverted T-sections to fall off of the trailing edge of the grate when such debris sufficiently blocks the openings.

The self-cleaning property of grates 50 and 150 are based on the upraised ribs serving to channel the flow of water on the flanges between the ribs, with the water splashing and flowing on said flanges serving to float and push debris further towards the trailing edge of the grate.

Preferably the openings between the flanges are at their widest at or near the grate trailing edge so that all or most of the water will fall through said opening as the water flows towards the trailing edge, with the narrower portion of the opening being located away from the trailing edge so that the flow of water initially falling upon the grate at the location of the narrower openings will be distributed between the flow of some water falling through the opening and some water flowing on the flange to float away debris.

As shown by dashed lines, the flanges may become progressively narrower as the openings become wider, in the direction towards the trailing edge, the water flowing uniformly downwards on the flange, parallel to the ribs, will progressively fall off of the flange into the opening as the water approaches the trailing edge, where the trailing edge of the grate is lower than the leading edge of the grate.

Having thus described the invention, what I claim as new and desire to secure by Letters Patents of the United States is:

1. A grate for use as a self-cleaning filter, comprising a grate assembly adaptable for mounting in an installed position along a diagonal plane to a horizontal axis with said grate formed with a leading edge opposed to a trailing edge, such that in the installed position the trailing edge is vertically lower than the leading edge, said grate assembly formed with a plurality of spaced upraised rib sections that each extend in the direction from the said leading edge of the said trailing edge, with at least one flange section located between a pair of said rib sections, the upper surface of which flange section extends in the said diagonal plane, with said rib sections extending above the said flange section and with said flange section forming an upper exposed surface of said grate assembly, and with at least one opening located between a pair of said rib sections and extending in the direction from the trailing edge to the leading edge, such that the flow of a liquid freely falling upon an upper section of the grate will be distributed between some flow of liquid on said flange or flanges flowing towards the trailing edge and some flow of liquid through said opening, and such that debris in the liquid that falls on the said flange or flanges, where said debris is of a larger size than the opening will accommodate, the said debris will be splashed or pushed by the flow of water on the flanges towards the trailing edge of the grate while most or all of the said water will fall through the opening before reaching the trailing edge, with said rib sections serving to channel the flow of water on said flange sections and said rib sections serving to support wide portions of debris above the surface of the flange section so as to prevent such debris from blocking the flow of water on the surface of said flange sections, with the flow of water channelled by said rib sections serving to wash debris resting on the flange surface of the trailing edge of the grate.

2. The combination as recited in claim 1 in which the opening increases in transverse width along the direction of the axis of the opening towards the trailing edge.

3. The combination as recited in claim 1 in which the flange decreases in transverse width along the direction of the axis of the flange towards the trailing edge.

4. The invention of claim 1, together with first receiver means located to receive liquid that is filtered through the opening of said grate, where said first receiver means is located below the grate opening, with the trailing edge of the grate extending beyond said first receiver means so that liquid and debris falling off said trailing edge does not fall vertically downwards into said first receiver means.

5. The invention of claim 4 together with second receiver means located below the trailing edge of said grate so as to receive overflow liquid and debris falling off of the trailing edge of the grate.

6. The invention of claim 4 in which the first receiver means is a storage tank for recovery and reuse of drain water.

7. The invention of claim 6 together with a receptacle for containment of chemicals useful in treatment of drain water, with said receptacle linked to the storage tank by a valve, together with means responsive to flow of water into said storage tank which means is linked to said valve so as to open said valve when water is flowing into said storage tank, and to close said valve upon cessation of such water flow, where first float means is linked to said grate to bias said grate in the first diagonal plane when said first float means is elevated by a given high level of liquid in the storage tank, so as to maintain the valve in the closed position after the liquid in the tank has reached the said given level.

8. The invention of claim 1 in which the opening between the flanges extends substantially to the trailing edge of the grate.

9. The invention of claim 8 in which the pair of rib sections bounding said opening extend substantially to the trailing edge of the grate.

10. A grate for use as a self-cleaning filter, comprising a grate assembly adaptable for mounting in an installed position along a diagonal plane to a horizontal axis with said grate formed with a leading edge opposed to a trailing edge, such that in the installed position the trailing edge is vertically lower than the leading edge, such grate assembly formed with a plurality of spaced upraised rib sections that each extend in the direction from the said leading edge to the said trailing edge, with at least one flange section located between a pair of said rib sections, the upper surface of which flange section extends in the said diagonal plane, and with at least one opening located between a pair of said rib sections and extending in the direction from the trailing edge to the leading edge, such that the flow of a liquid freely falling upon an upper section of the grate will be distributed between some flow of liquid on said flange or flanges flowing towards the trailing edge and some flow of liquid through said opening, and such that where debris in the liquid that falls on the said flange or flanges, and where said debris is of a larger size than the opening will accomodate, the said debris will be splashed or pushed by the flow of water on the flanges towards the trailing edge of the grate while most or all of the said water will fall through the opening before reaching the trailing edge, together with first receiver means located to receive liquid that is filtered through the opening of said grate, where said first receiver means is located below the grate opening, in which the said first receiver means is a storage tank for recovery and reuse of drain water, together with a receptacle for containment of chemicals useful in treatment of drain water, with said receptacle linked to the storage tank by a valve, together with means responsive to flow of water into said storage tank which means is linked to said valve so as to open said valve when water is flowing into said storage tank, and to close said valve upon cessation of such water flow, in which the said means to control said valve comprises pivotal means of mounting of said grate in a first generally diagonal plane, spring means to bias the trailing edge of said grate in an upwards direction to said first diagonal plane, said pivotal means located so that weight of water on the flanges of said grate biases the trailing edge of the grate in the downwards direction from said first diagonal plane, to a second diagonal plane of said grate, linkage means for said grate to said valve such that when said grate is pivoted by the flow of water to the second diagonal plane, the said valve is opened, with said linkage means closing said valve when the grate is in the first diagonal plane.

11. The invention of claim 10, in which the trailing edge of the grate extends beyond said first receiver means so that liquid and debris falling off of said trailing edge does not fall vertically downwards into said first receiver means.

12. The invention of claim 11 together with second receiver means located below the trailing edge of said grate so as to receive overflow liquid and debris falling off of the trailing edge of the grate.

* * * * *